United States Patent [19]

Oliver et al.

[11] Patent Number: 5,402,110
[45] Date of Patent: Mar. 28, 1995

[54] HYDRAULIC FLUID LEAK DETECTION SYSTEM AND METHOD

[75] Inventors: Joseph J. Oliver, Lincoln, Nebr.; Christopher L. Young, Fargo, N. Dak.; Richard D. Bednar, Lake Mills, Wis.

[73] Assignee: Ransomes America Corporation, Lincoln, Nebr.

[21] Appl. No.: 191,518

[22] Filed: Feb. 3, 1994

[51] Int. Cl.⁶ ............................................. G08B 21/00
[52] U.S. Cl. ...................................... 340/605; 73/49.2; 73/295; 73/290 R
[58] Field of Search ............... 340/605; 73/295, 290 B, 73/290 R, 292, 49.2 T

[56] References Cited

U.S. PATENT DOCUMENTS

| | | | |
|---|---|---|---|
| 3,438,247 | 6/1967 | Lotti et al. | |
| 3,568,705 | 3/1971 | Boyadjieff et al. | 137/87 |
| 3,576,959 | 5/1971 | Bogosoff | 340/450.1 |
| 3,667,605 | 6/1972 | Zielinski | 210/170 |
| 3,685,531 | 8/1972 | Byford | 91/421 |
| 3,708,245 | 1/1973 | King | 417/13 |
| 4,020,481 | 4/1977 | Nakagawa | 340/624 |
| 4,057,700 | 11/1977 | Nakashima | 200/84 C |
| 4,090,396 | 5/1978 | O'Brien | 340/624 |
| 4,152,925 | 5/1979 | Lindh | 73/40.5 R |
| 4,274,328 | 6/1981 | Pedersen | 91/445 |
| 4,522,109 | 6/1985 | Marchi et al. | 91/420 |
| 4,522,167 | 6/1985 | Hurner | 184/103.1 |
| 4,549,429 | 10/1985 | Kurt | |
| 4,563,674 | 1/1986 | Kobayashi | 340/620 |
| 4,571,987 | 2/1986 | Horner | 73/292 |
| 4,590,462 | 5/1986 | Moorehead | 340/605 |
| 4,591,837 | 5/1986 | Martinez | 340/605 |
| 4,611,620 | 9/1986 | Wang | 137/100 |
| 4,732,035 | 3/1988 | Lagergren et al. | 73/49.2 T |
| 4,750,775 | 6/1988 | Miller | 296/38 |
| 4,781,057 | 11/1988 | Hyfantis, Jr. et al. | 73/49.2 T |
| 4,811,601 | 3/1989 | Tolan | 73/49.2 T |
| 4,827,762 | 5/1989 | Hasselmann | 73/49.2 T |
| 4,852,054 | 7/1989 | Mastandrea | 340/605 |
| 4,961,064 | 10/1990 | Hara | 338/231 |
| 4,987,769 | 1/1991 | Peacock et al. | 73/49.7 |
| 5,021,665 | 6/1991 | Ames | 250/357.1 |
| 5,156,042 | 10/1992 | Carlin et al. | 73/49.2 T |
| 5,187,973 | 2/1993 | Kunze et al. | 73/40.5 R |
| 5,315,529 | 5/1994 | Farmer | 364/509 |

Primary Examiner—Jeffery A. Hofsass
Assistant Examiner—Julie Lieu
Attorney, Agent, or Firm—Harness, Dickey & Pierce

[57] ABSTRACT

A system such as one for detecting when a hydraulic fluid system adapted to a turf care machine, has developed a leak and to warn the machine operator of such a leak before an appreciable amount of hydraulic fluid is allowed to leak from the system. The system includes a reservoir for holding a quantity of hydraulic fluid. The reservoir is connected via a connecting tube or hose to an expansion tank mounted adjacent to the reservoir. The expansion tank includes a fitting having an elongated tube extending down into the expansion tank. The end of this tube is maintained substantially below the level of hydraulic fluid in the expansion tank during operation of the turf care machine to which it is attached. As the machine is operated, the hydraulic fluid expands with rising temperature, and the connecting tube communicates the expanding fluid to the expansion tank. When operation of the machine is discontinued the hydraulic fluid contracts as it cools. As the hydraulic fluid contracts, the hydraulic fluid in the expansion tank, is automatically drawn by a siphoning action through the elongated tube within the expansion tank through the connecting tube and back into the reservoir. A float type fluid level sensor is provided and mounted to measure the level of hydraulic fluid within the expansion tank. The float level sensor sends an electronic signal corresponding to the fluid level in the expansion tank to a microcomputer based monitoring unit. The monitoring unit also senses the fluid temperature and interprets these electronic signals and, compensating for volumetric fluctuations due to the changing fluid temperature, and determines if conditions exist which indicate a hydraulic fluid leak exists. If such conditions exist, the monitoring unit produces a warning signal which is communicated to the vehicle operator.

20 Claims, 8 Drawing Sheets

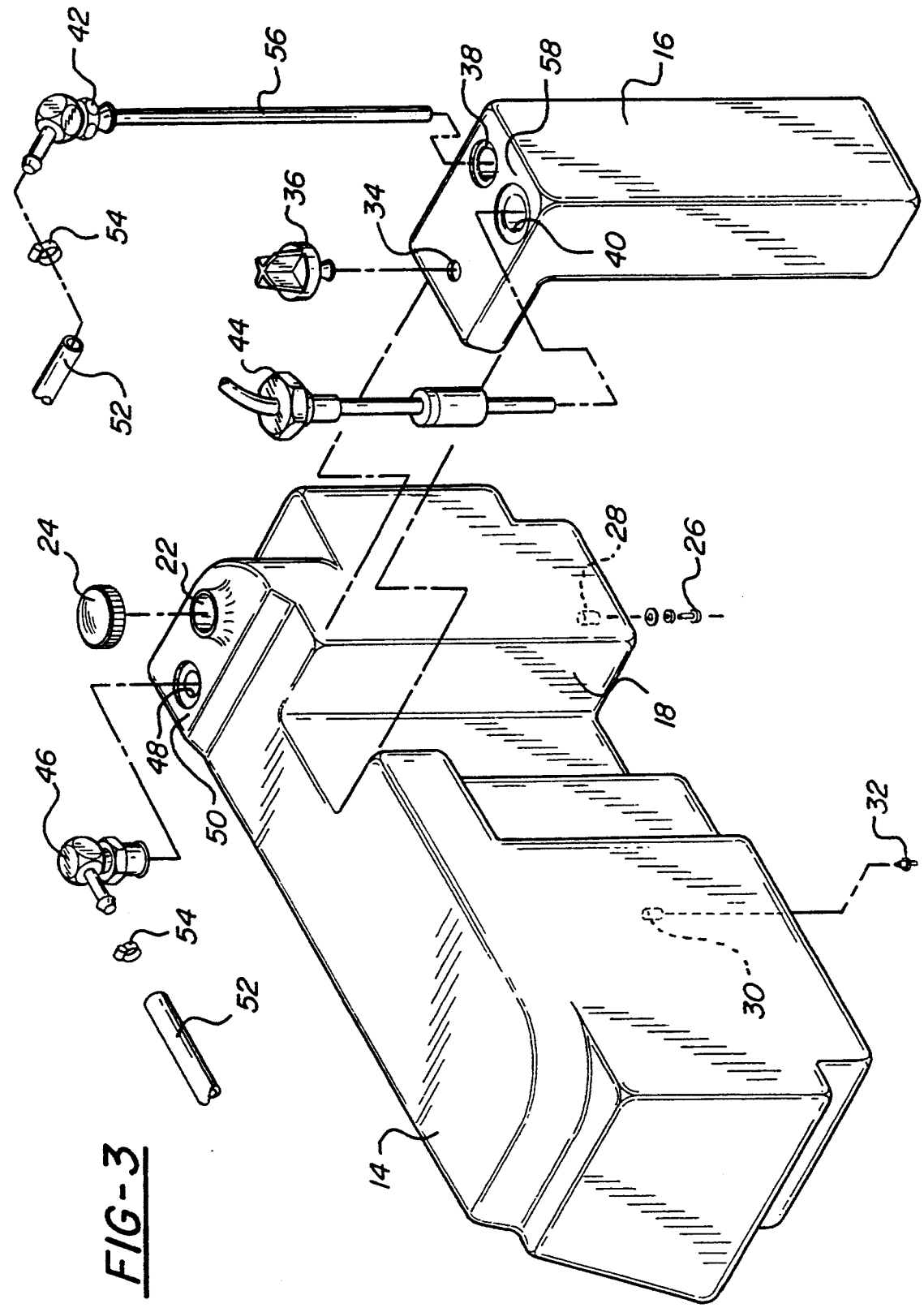

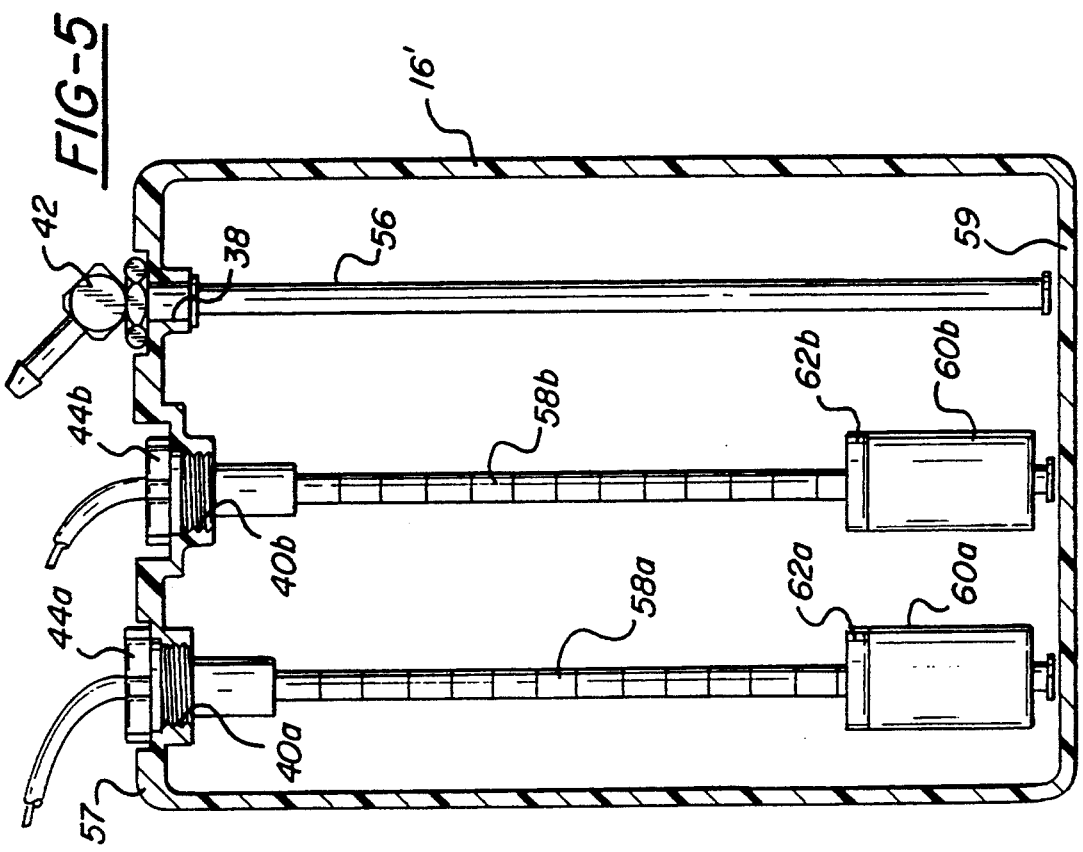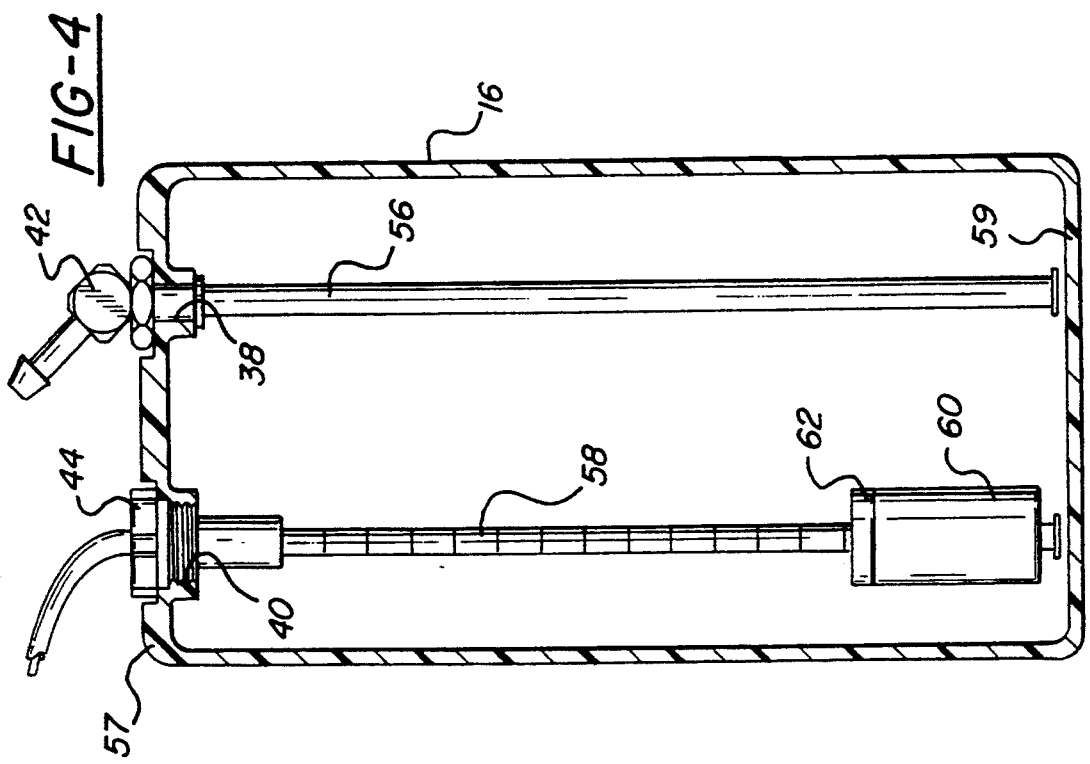

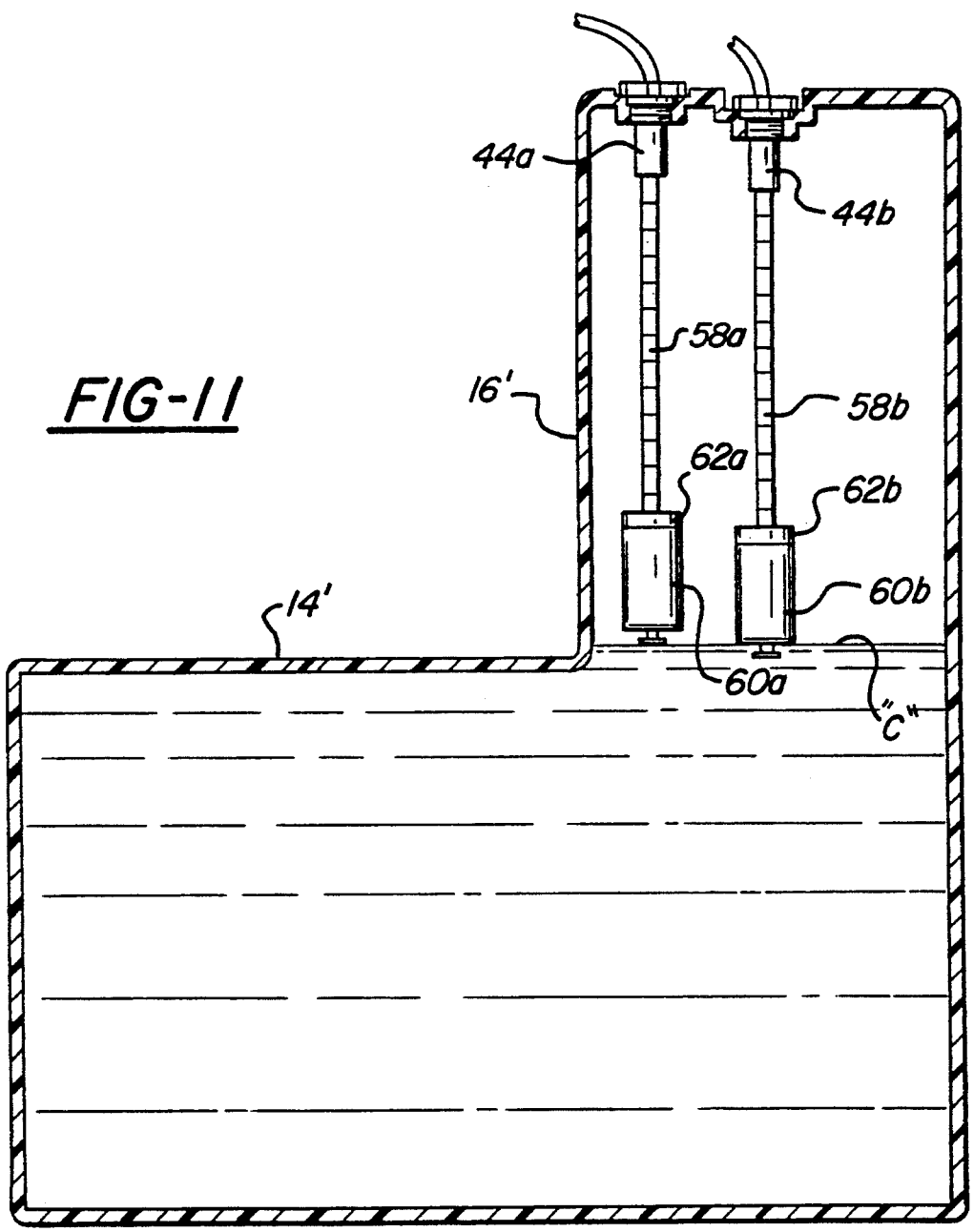

HYDRAULIC FLUID LEAK DETECTION SYSTEM AND METHOD

BACKGROUND OF THE INVENTION

1. Field of the Invention

The present invention relates generally to turf care equipment, and more particularly, to a system for detecting the occurrence of leaks in a hydraulic fluid system of a turf care machine and for providing a warning to the machine operator of such condition.

2. Discussion

Turf care machines are powered by a variety of means such as belts and pulleys, shafts and linkages, and the like. A common method of powering a turf care machine is to provide a source of pressurized hydraulic fluid. The pressurized hydraulic fluid can be used to power hydrostatic drive motors for propelling the turf care machine or for powering various implements such as mowers, aerators and the like. One problem with such machines is the potential for developing a leak in the hydraulic system. Should the system develop a large leak, the hydraulic fluid, under pressure, is rapidly expelled from the hydraulic system and onto the turf being treated by the machine. Often, because the machine is being operated early in the morning or late in the evening, the operator does not see the fluid spewing onto the turf until a considerable amount has leaked out, and the damage to the turf has been done. In other cases, the system develops a slow leak which leaks almost imperceptible amounts of hydraulic fluid onto the turf, but amounts sufficient to cause damage. Moreover, because the slow leak is not readily detected, fluid may be lost over several greens hence causing widespread damage. Because of the time required to grow a golf course green, sometimes several years to full maturity, and the cost associated with starting and maintaining a green, generally tens of thousands of dollars, it is vitally important to be able to detect when a machine incorporating a hydrostatic drive system has developed a leak.

U.S. Pat. No. 4,591,837 to Martinez (the Martinez system), the disclosure of which is hereby incorporated by reference, discloses a system for detecting when a hydrostatic drive system of a turf care machine has developed a leak and for providing a warning signal if such a leak occurs. The system includes a tube which communicates with and extends above the hydraulic fluid reservoir. A chamber is disposed above the tube, and there is a float disposed within the tube. At the start of operation, the machine operator fills the hydraulic fluid reservoir such that the float remains near the top of the tube. The float has a contact imbedded therein, and the tube has complementary contacts positioned such that when the float is near the top of the tube a circuit is established. During operation, expanding fluid is allowed to flow past the float and into the chamber. If a leak occurs, the fluid level within the reservoir begins to drop. If it drops a sufficient amount such that float moves away from the top of the tube, the circuit is broken and a leak is indicated.

The Martinez system suffers a number of disadvantages. First, the operator must manually drain fluid from the chamber back into the reservoir each time before using the machine. In addition, the system is only capable of accommodating a modest amount of fluid expansion. A second embodiment of the Martinez system includes a drain port for slowly allowing the fluid in the chamber to drain back into the reservoir. This relieves the operator of the task of draining the fluid back into the reservoir, however, it makes the system ineffectual for detecting small leaks. Furthermore, the Martinez system is not adapted to indicate the actual amount of hydraulic fluid within the system or the temperature of the hydraulic fluid.

SUMMARY OF THE INVENTION

The present invention provides a hydraulic leak detection system which includes a reservoir for holding a quantity of hydraulic fluid. The reservoir is connected via a connecting tube or hose to an expansion tank mounted substantially adjacent to the reservoir. The expansion tank includes a fitting having an elongated tube extending down into the expansion tank. The end of this tube is maintained substantially below the level of hydraulic fluid in the expansion tank during operation of the turf care machine to which it is attached. As the machine is operated, the hydraulic fluid expands with rising temperature, and the connecting tube communicates the expanding fluid to the expansion tank. When operation of the machine is discontinued the hydraulic fluid contracts as it cools. As the hydraulic fluid within the system contracts, the hydraulic fluid in the expansion tank is automatically drawn, by siphoning action, through the elongated tube from the expansion tank through the connecting tube and back into the reservoir.

The hydraulic leak detection system further includes at least one float type fluid level sensor mounted to measure the level of hydraulic fluid within the expansion tank. The float level sensor sends an electronic signal corresponding to the fluid level in the expansion tank to a microcomputer based monitoring unit. The monitoring unit also senses the fluid temperature in the reservoir and interprets the electronic signals, compensating for volumetric fluctuations due to the changing fluid temperature, and determines if conditions indicate a hydraulic fluid leak exists. If so, the monitoring unit produces a warning signal which is communicated to the turf machine operator.

In an additional embodiment of the present invention, the expansion tank is made integral to and mounted above the reservoir. As the hydraulic fluid is heated it expands directly into the expansion chamber where at least one float sensor measures the height of the fluid therein.

The hydraulic leak detection system of the present invention is also operable to display to the machine operator the actual amount of hydraulic fluid within the system and is capable of indicating if the level is too low as well as too high.

The hydraulic fluid leak detection system of the present invention is also operable to report the temperature of the hydraulic fluid in the system and to provide a warning indication if the fluid temperature is too high.

The hydraulic fluid leak detection system of the present invention is further operable to determine the existence of a leak in the hydraulic fluid system based upon the changing volume of fluid within the expansion tank.

These and other objects, advantages and features of the present invention will become readily apparent from the following detailed description, subjoined claims and drawings.

BRIEF DESCRIPTION OF THE DRAWINGS

FIG. 3 is an exploded assembly perspective of the hydraulic oil leak detection system of the present invention;

FIG. 4 is a sectional view taken along line 4—4 of FIG. 2 illustrating the arrangement of the level sensor within the expansion tank of the hydraulic fluid leak detection system of the present invention;

FIG. 5 is a view similar to FIG. 4 illustrating an alternative embodiment of the level sensor of the hydraulic fluid leak detection system of the present invention;

FIG. 11 is a sectional view through a reservoir and expansion tank according to an additional embodiment of the present invention.

DETAILED DESCRIPTION OF THE PREFERRED EMBODIMENTS

Figure 1:
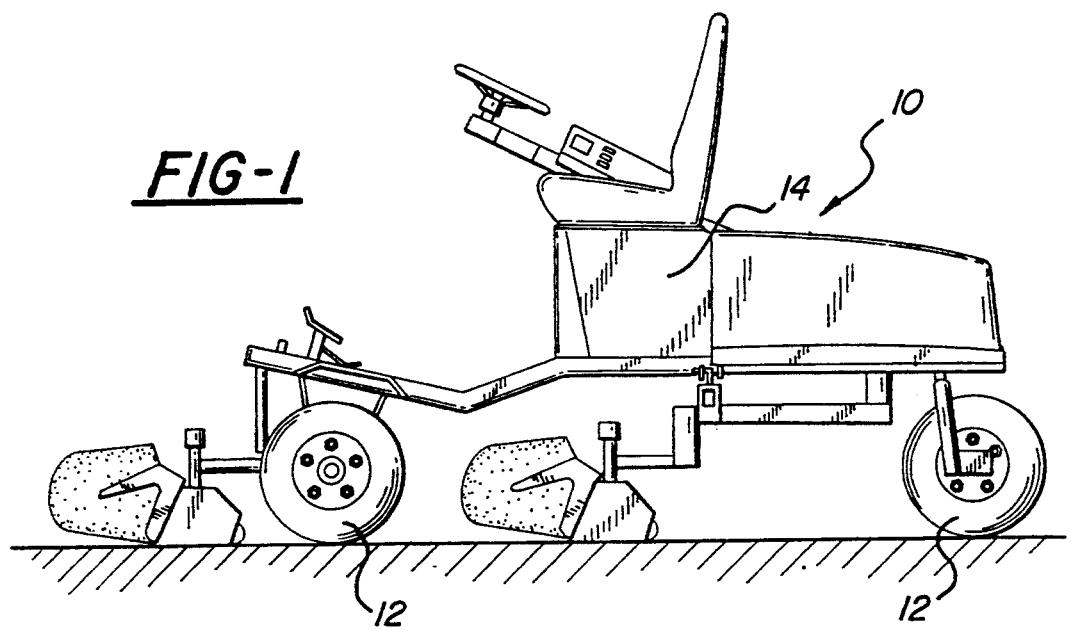
FIG. 1 is a perspective view of a typical turf machine having a pressurized hydraulic fluid system and being fitted with the hydraulic oil leak detection system of the present invention.

With reference to the drawings, and particularly FIG. 1, a typical turf machine 10 which is adapted as a riding type greens mower is shown. Turf machine 10 includes a plurality of ground engaging wheels 12 which are adapted to be driven by hydrostatic motors from a source of pressurized hydraulic fluid. Such a system is disclosed and described in U.S. Pat. No. 5,199,525 assigned to Ransomes, Inc. the disclosure of which is hereby expressly incorporated by reference. The hydraulic fluid system includes a reservoir 14 for providing a supply of hydraulic fluid to a pressurizing pump typically driven by an internal combustion engine, and control valving for distributing the pressurized fluid via a plurality of conduits to the hydrostatic drive motors and for returning low pressure fluid to reservoir 14. The hydraulic system further includes an expansion tank 16. During operation of the machine, the fluid is heated by the work imparted upon it by the pressurizing pump and by transfer from the various elements of turf machine 10. Heating of the fluid causes its thermal expansion, and the expanding fluid is communicated from reservoir 14 to expansion tank 16.

Figure 2:
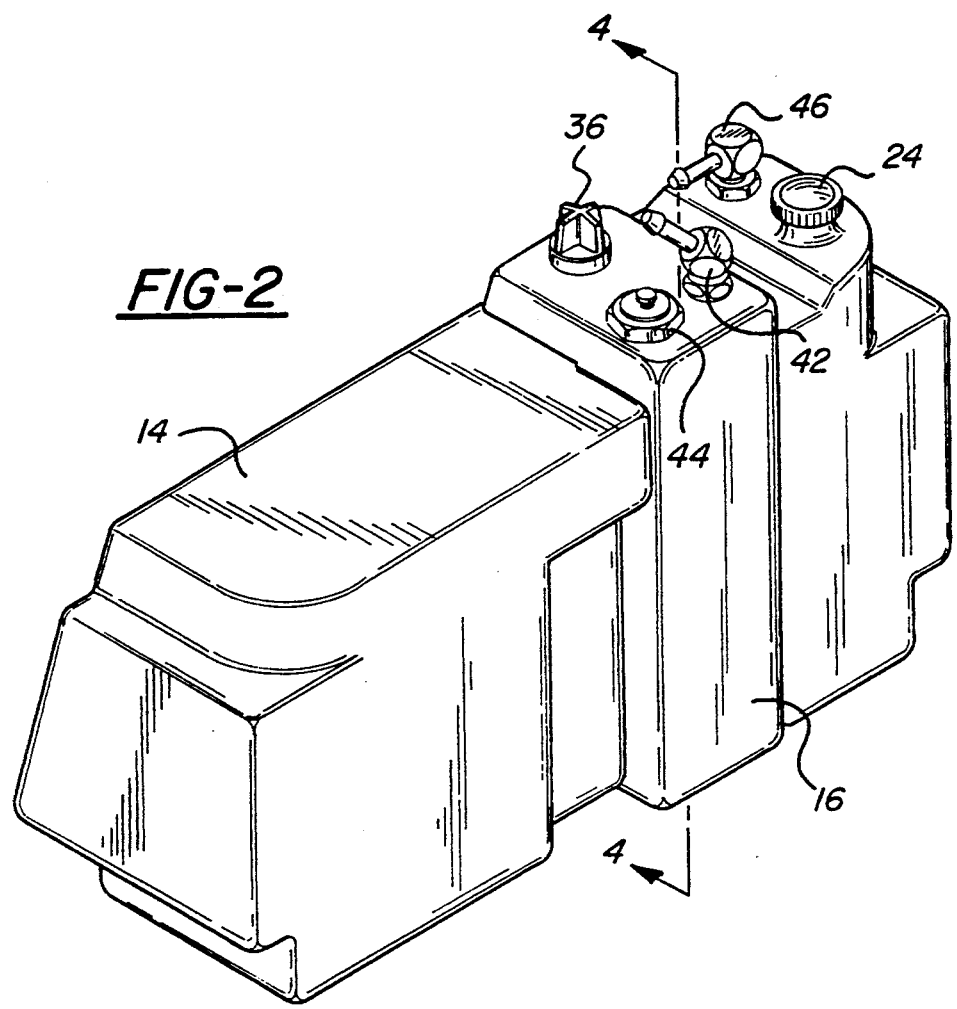
FIG. 2 is an assembly perspective of the hydraulic oil leak detection system of the present invention removed from the turf machine.

FIGS. 2 and 3 illustrate reservoir 14, expansion tank 16 and the associated plumbing for interconnecting the two. More particularly, reservoir 14 is formed as a hollow vessel and expansion tank 16 is a similar, but smaller, vessel secured adjacent thereto. In the preferred embodiment shown, reservoir 14 is formed with an indented portion 18 and expansion tank 16 is formed to be received into the indented portion 18 for providing a contemporary, integral appearance.

Reservoir 14 is formed with a plurality of fittings (not shown) for interconnecting with the hydraulic fluid system of turf machine 10, and further includes a filling port 22 which is sealed during operation of turf machine 10 by non-vented cap 24. Reservoir 14 is secured to turf machine 10 by a plurality of fasteners, one of which is shown at 26, which engage bosses 28 formed integral to reservoir 14. Reservoir 14 is further formed with an aperture 30 at its base for receiving temperature sensor 32. Expansion tank 16 is similarly secured to turf machine 10 by fasteners adjacent to reservoir 14. Expansion tank 16 includes a port 34 fitted with a breather plug 36 and a pair of ports 38 and 40 for securing an adaptor 42 and a level sensor 44, respectively.

Reservoir 14 is fitted with an angled adaptor 46 secured to a port 48 formed in its upper surface 50, and expansion tank 16 is fitted with adaptor 42 in port 38. A flexible conduit 52 interconnects adaptors 46 and 42 and is secured thereto by clamps 54. Adaptor 42 further includes expansion tube 56 which extends from the upper surface 58 of expansion tank 16 to nearly the bottom 59 thereof. As will be appreciated, as hydraulic fluid within reservoir 14 expands due to heating, the expanding fluid is communicated via conduit 52 to expansion tank 16. When operation of turf machine 10 is discontinued, the hydraulic fluid within reservoir 14 and expansion tank 16 cools and contracts. The contracting fluid is drawn by siphoning action from expansion tank 16 to reservoir 14 by expansion tube 56 and conduit 52.

FIG. 4 illustrates level sensor 44 secured in expansion tank port 40 and extending downwardly into expansion tank 16. In the preferred embodiment, level sensor 44 is an eleven inch long float type sensor. More particularly, level sensor 44 includes a shaft 58 within which are disposed a plurality of reed switches (not shown) and resistors (not shown) which are connected in series. The reed switches act as shunts for selectively connecting a plurality of the resistors in series. The reed switches are magnetically actuated, and level sensor includes a float 60 and a magnet 62 which are slidably disposed about shaft 58. As the fluid level within expansion tank 16 rises and falls, float 60 moves upwardly and downwardly along shaft 58. Magnet 62, secured to float 60 is also caused to move upwardly and downwardly along shaft 58 causing various switches to be closed. By sensing the resistance of level sensor 44 the position of float 60 and magnet 62 may be determined, and hence, the level of fluid within expansion tank 16 may be determined. A suitable level sensor 44 is model no. 1-90-116456 manufactured by Phoenix International Corporation of Fargo, N. Dak.

Figure 6:
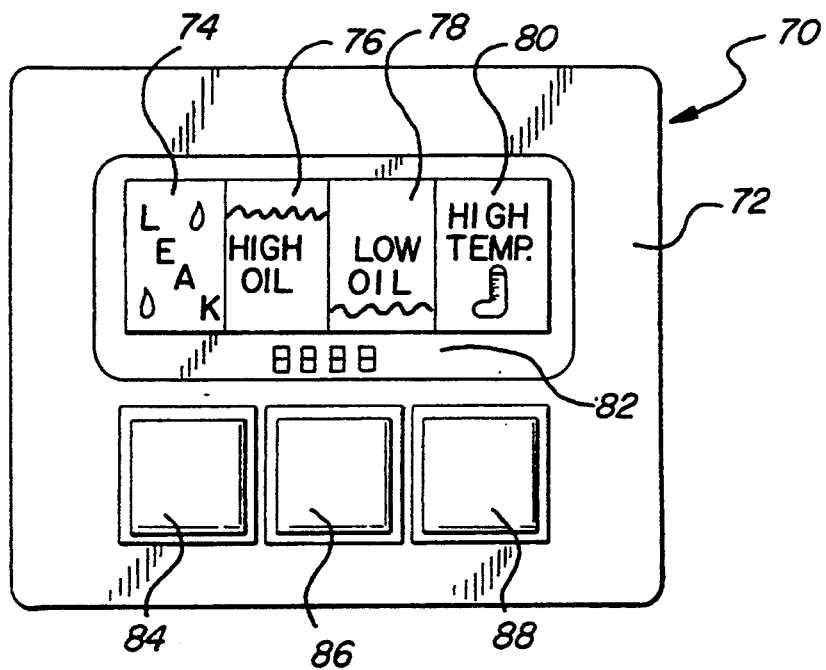
FIG. 6 is a plan view of the monitoring unit of the hydraulic fluid leak detection system of the present invention.

FIG. 6 illustrates the face of monitoring unit 70 for the leak detection system of the present invention. Monitoring unit 70 includes an annunciator panel 72 which includes a plurality of icons 74–78 for indicating the status of the hydraulic fluid system. For example, in the preferred embodiment, icons 80, 78, 76 and 74 are provided for indicating high fluid temperature, low fluid level, high fluid level and leak, respectively. Also, a numeric display 82 is provided for indicating the actual fluid level based upon the sensor reed switch closed or fluid temperature in engineering units. It should be understood that monitoring unit 70 is intended to be used outdoors and in sunlight and therefore that the icons 74–78 and display 82 should have sufficient illumination to be easily visible in sunlight. A plurality of membrane buttons 84–88 are also provided for allowing the turf machine operator to selectively view the system information and to calibrate the leak detection system. For example, pressing button 84 once displays temperature in degrees fahrenheit, pressing button 88 once displays the current fluid level in reed counts, pressing button 86 once clears the display, pressing and holding button 86 displays the calibration values, and pressing and holding all three buttons 84, 86 and 88 causes the calibrations to be written to the internal memory of the unit. In the preferred embodiment, monitoring unit 70 is based upon a Motorola 6800 series microprocessor and includes at least on one EEPROM memory device.

Figure 7:
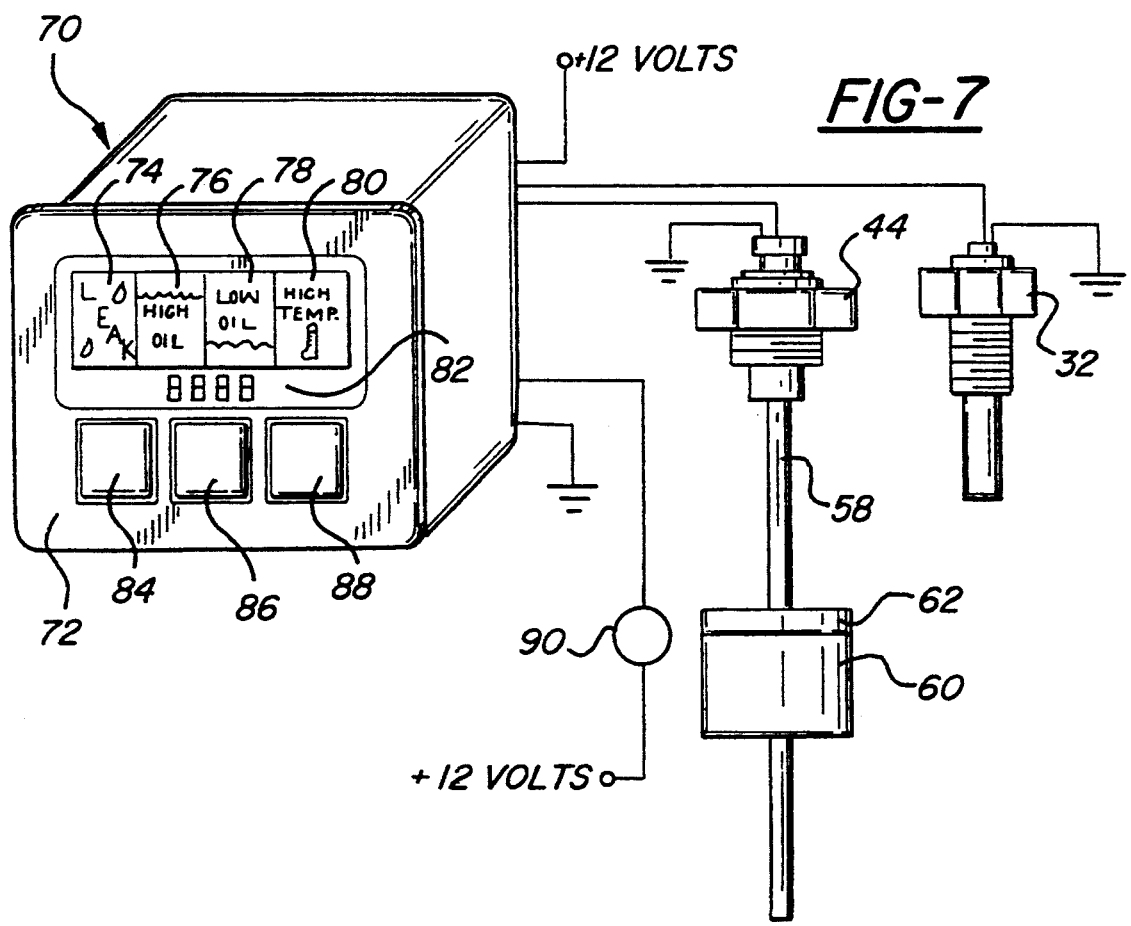
FIG. 7 is a schematic wiring diagram of the hydraulic fluid leak detection system of the present invention.

FIG. 7 illustrates the electrical connections of the hydraulic leak detection system. As can be seen, monitoring unit 70 is supplied with twelve (12) volts DC from the turf machine battery source and is grounded to the turf machine chassis. Level sensor 44 and temperature sensor 32 are each connected to monitoring unit 70, and a piezo (electric) buzzer 90 is provide and connected to monitoring unit for providing an audible warning.

Figure 8:
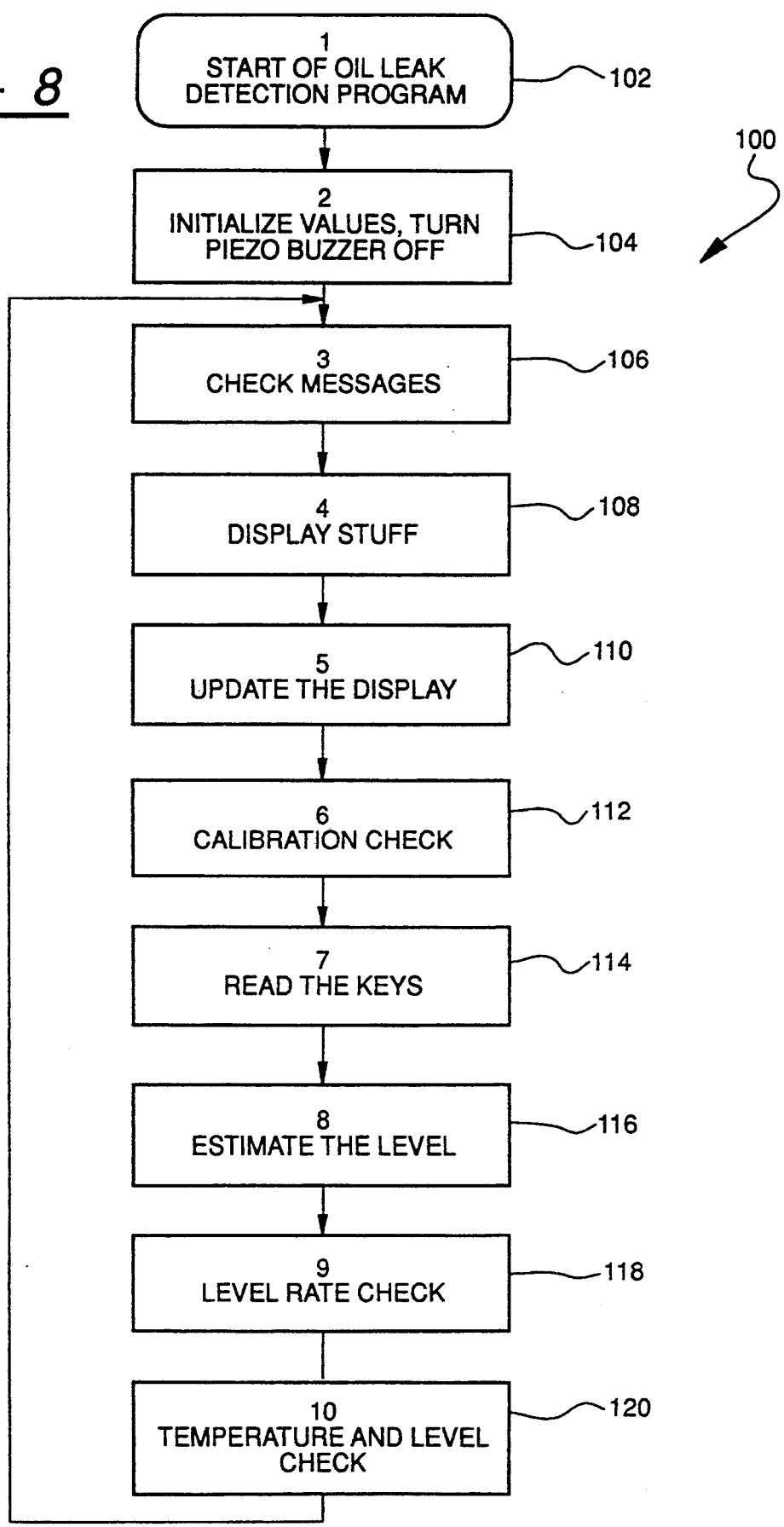
FIG. 8 is a flow chart illustrating the steps for determining a leak condition in the hydraulic fluid system of a typical turf machine in accordance with the method of the present invention.
Figure 9:
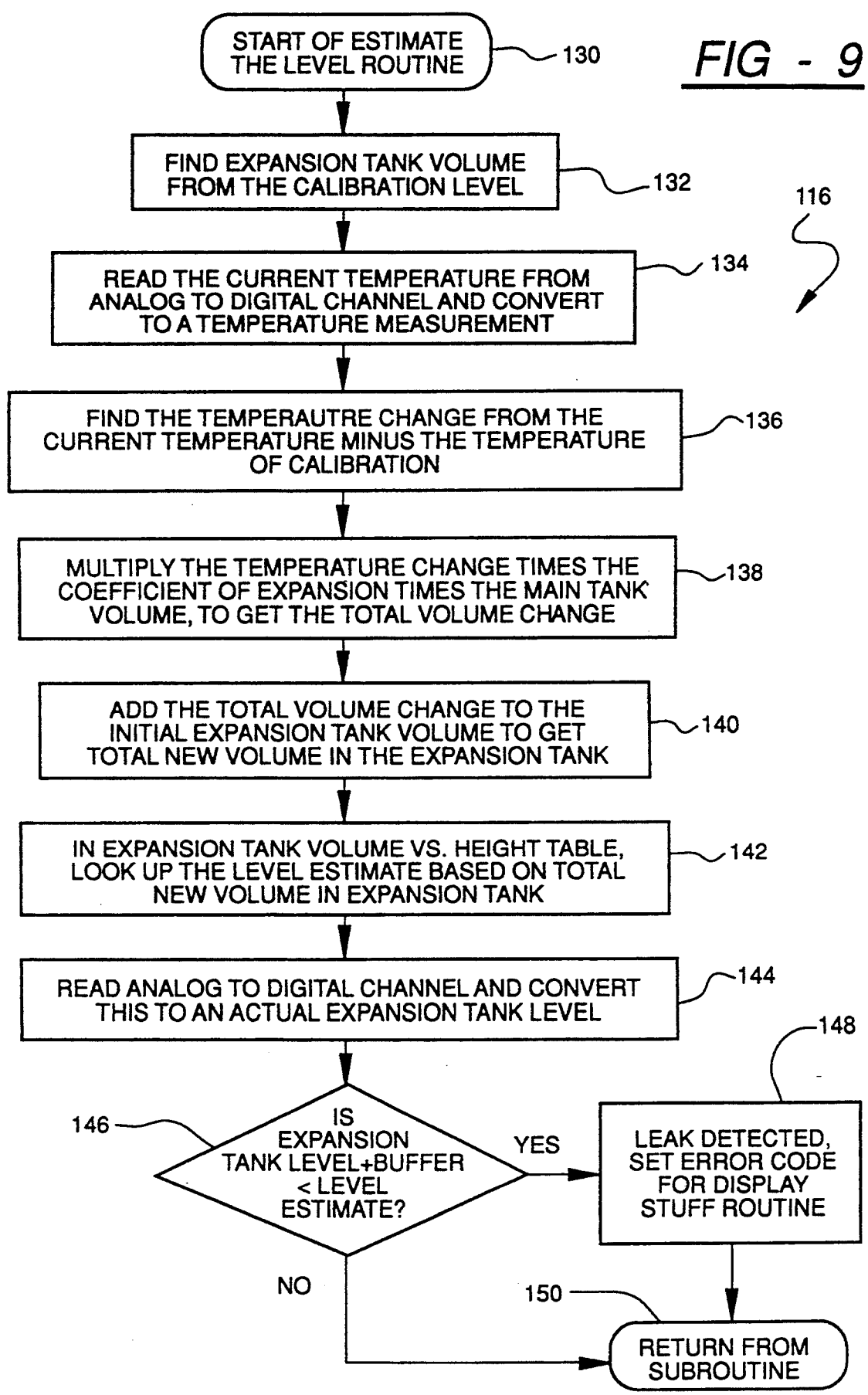
FIG. 9 is a flow chart further illustrating the steps for determining the level of fluid within the hydraulic fluid system of a typical turf machine in accordance with the method of the present invention.
Figure 10:
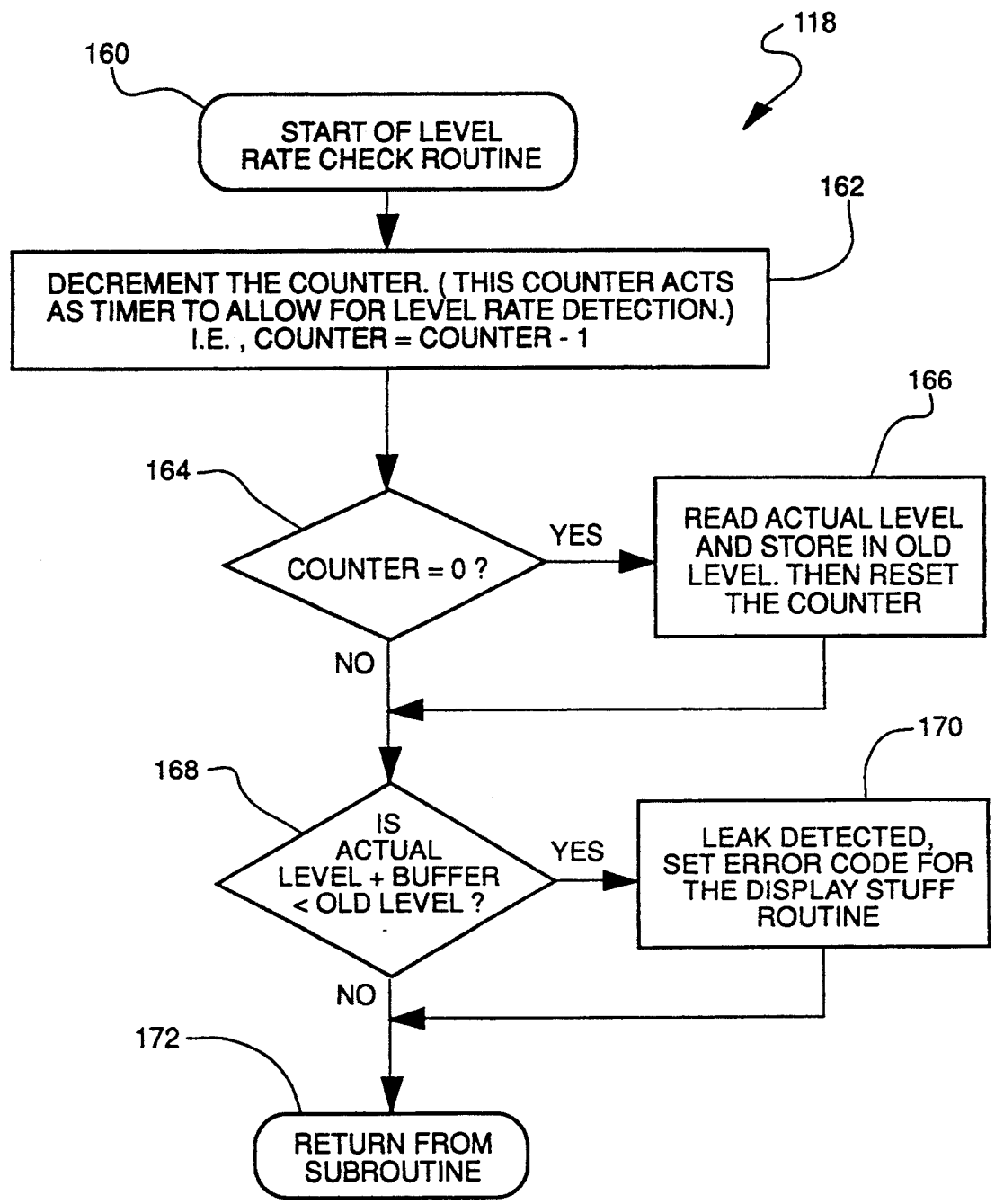
FIG. 10 is a flow chart illustrating the steps for determining the rate of change of the level of hydraulic fluid within the hydraulic fluid system of a typical turf machine in accordance with the method of the present invention.

With reference to FIGS. 8–10, the method 100 of monitoring the hydraulic fluid system of turf machine and for determining the existence of a leak will be described. The method enters at bubble 102 and proceeds to the initialize values, turn piezo buzzer off block 104 at which an initiation routine is performed. During initialization, the calibration values are retrieved from the EEPROM, the icons 74–78 are illuminated and the buzzer 90 is activated for approximately one second. The method then proceeds to the check messages block 106. Messages are data from operator inputs via membrane buttons 84–88, or indications from the estimate the level 116 and level rate check 118 blocks, which will be described below, that a leak has occurred. The method then proceeds to the display stuff block 108. At block 108 a display driver determines which icons 74–78 to illuminate and/or whether or not to activate piezo buzzer 90 in response to the messages and so activates the icons 74–78 and/or piezo buzzer 90. At the update the display block 110 an LCD display driver operates to ,display the most recent numeric values for the selected units, fluid level or fluid temperature, on numeric display 82.

The method then proceeds to the calibration check block 112 where a software flag is checked to determine whether the operator has indicated that a calibration should be performed. If the calibration flag is set, a calibration is performed. A calibration is requested by holding button 84 until icon 74 is illuminated, then holding button 88 until icon 80 is illuminated and then holding buttons 84 and 88 simultaneously for three (3) seconds. During calibration, the fluid temperature in reservoir 16 is determined as well as the fluid level in expansion tank 16. This information is then stored in the EEPROM by pressing and holding buttons 84–88 for three seconds. The procedure of pressing button 84 and then button 68 and then both buttons 84 and 88 provides a lock-out means to prevent unauthorized individuals from calibrating the system.

The method next proceeds to the read the keys block 114. The read the keys block 114 reads the membrane switches 84–88 and sets system flags, such as the calibration flag, display temperature flag, etc., so that the requested functions are performed. The method then proceeds to the estimate the level block 116.

The estimate the level block 116 executes a routine for determining the actual level of fluid in the expansion tank 16 and for comparing it to an estimated level which is determined based upon the present conditions, i.e., fluid temperature, and the calibration data. FIG. 9 illustrates the steps of the estimate the level routine which enters at bubble 130 and then proceeds to the find expansion tank volume block 132 where the calibration level is retrieved from the EEPROM. The method then proceeds to the read the current temperature block 134 and reads the present value of an analog to digital converted which converts the temperature sensor signal to a binary value. Next, at the find the temperature change block 136, the calibration fluid temperature, retrieved from the EEPROM, is subtracted from the present fluid temperature just read. At the get the total volume change block 138, the total hydraulic fluid system volume change is determined according to the following equation:

$$\Delta V = \alpha * \Delta T * SV$$

where $\Delta V$ is the hydraulic system fluid volume change, $\alpha$ is the coefficient of expansion of the fluid, $\Delta T$ is the change in temperature and $SV$ is the hydraulic system fluid volume, i.e., the volume of reservoir 14. At the get new expansion tank volume block 140, $\Delta V$ is added to the volume in the expansion tank determined from the calibration to determine the present volume of fluid in the expansion tank 16. At the look up expansion tank level block 142, the estimated level of the expansion tank 16 is looked up in a data table of level versus volume. Next, at the get actual expansion tank level block 144, the actual level of the expansion tank 16 is read from level sensor 44. At diamond 146 the estimated level is compared to the actual level. If the estimated level is within a buffer value, the buffer being based upon the desired sensitivity of the system which can be adjusted to allow small level differences between the estimated expansion tank level and the actual expansion tank level without triggering the alarm, of the actual level, then the routine is exited at bubble 150. If the estimated level is not within a buffer value of the actual level, at leak detected block 148 an error code is set for the display stuff routine, and the routine is exited at bubble 150.

After performing the estimate the level routine, the method proceeds to the level rate check block 118. The level rate check routine is illustrated in FIG. 10, and it determines the rate at which the fluid level is changing within the system. If the level is changing too rapidly, a leak is indicated. With reference to FIG. 10, the level rate check routine enters at bubble 160 and proceeds to the decrement counter block 162. A counter is decremented by one unit each time through the routine. At diamond 164 if the counter is zero, the actual expansion tank level is read and saved as the old level, and the counter is reset at block 166. At diamond 168 if the actual level is not within a buffer value of the old level, a leak is detected and at leak detected block 170 an error code is set. The routine then exits at bubble 172.

At temperature and level check block 120 the actual fluid temperature in reservoir 14 and the actual fluid level in expansion tank 16 are checked against system constants. If the actual temperature and level is above or below these constants, an error code is set to cause the display stuff routine to illuminate the appropriate icon 74-78 and/or to activate the piezo buzzer 90. The method then loops back to check messages block 104 and repeats. The method continuously loops during operation of turf machine 10 for detecting hydraulic fluid system operation and the presence of leaks.

FIG. 5 illustrates an alternative arrangement for expansion tank 16 and level sensor 44. In FIG. 5, expansion tank 16' is shown modified to accommodate two (2) level sensors 44a and 44b, respectively. As previously discussed, level sensor 44 has a plurality of switches spaced along shaft 58, and in the preferred embodiment, level sensors 44 is eleven (11) inches long with nine (9) switches spaced at one (1) inch intervals. Thus, level sensor 44 has a sensitivity of approximately one (1) inch. In FIG. 5, a pair of level sensors 44a and 44b are shown offset with respect to each other by approximately ½ inch, or ½ the sensitivity range of a single level sensor 44. The level sensors 44a and 44b are then wired in series to monitoring unit 70. As will be appreciated, this arrangement provides for ½ inch sensitivity or approximately twice the sensitivity of a single level sensor 44. In all other aspects the hydraulic fluid leak detection system of the present invention functions as described.

FIG. 11 illustrates an alternate embodiment for the arrangement of reservoir 14 and expansion tank 16 wherein primed reference numerals are used to identify similar elements from the preceding embodiment. As can be seen from FIG. 11, expansion tank 16' is made integral to reservoir 14' such that hydraulic fluid contained in reservoir 14' is also in communication with expansion tank 14'. Float sensors 44a and 44b are shown disposed within expansion tank 16' for measuring the fluid level as described, the level for cold fluid being indicated at "C". As will be appreciated, as the hydraulic fluid is heated and expands, it will fill expansion tank 16', and as the fluid cools, it will contract back into reservoir 14'. It should also be understood that a single float sensor may be used depending on the required sensitivity of the leak detection system.

While specific embodiments have been shown and described in detail to illustrate the principles of the hydraulic leak detection system of the present invention, it will be understood that the invention may be embodied otherwise without departing from such principles. For example, one skilled in the art will readily recognize from such discussion and from the accompanying drawings and claims that various changes, modifications and variations can be made therein without departing from the spirit and scope of the invention as described in the following claims.

What is claimed is:

1. A hydraulic fluid leak detection system for a turf machine having a pressurized hydraulic fluid system including a reservoir of hydraulic fluid, the system comprising:
   an expansion tank disposed adjacent to and in communication with the reservoir,
   a first sensor disposed within the expansion tank, the first sensor operable for sensing the level of hydraulic fluid over a range of possible fluid levels in the expansion tank and for producing a first electronic signal varying in accordance with the hydraulic fluid level;
   a second sensor operable for sensing the temperature of the hydraulic fluid in the reservoir and for producing a second electronic signal corresponding thereto;
   processing means for receiving the electronic signals and for determining from the first and second signal if a leak exists in the hydraulic fluid system; and
   means for indicating to an operator that a leak exists in the hydraulic fluid system.

2. The hydraulic fluid leak detection system of claim 1 wherein the processing means is further operable for determining if the hydraulic fluid level within the system is below a predefined normal operating level.

3. The hydraulic fluid leak detection system of claim 1 wherein the processing means is further operable for determining if the hydraulic fluid level within the system is above a predefined normal operating level.

4. The hydraulic fluid leak detection system of claim 1 wherein the processing means is further operable for determining if the hydraulic fluid temperature within the system is above a predefined normal operating range.

5. The hydraulic fluid leak detection system of claim 1 wherein the processing means is operable to determine an estimated level of fluid within the expansion tank and for comparing the estimated level of fluid to an actual fluid level determined by the first sensor for signalling the presence of a leak.

6. The hydraulic fluid leak detection system of claim 1 wherein the processing means is operable to determine a rate of change of the fluid level within the expansion tank and for comparing the determined rate of change to an allowable rate of change for signalling the presence of a leak.

7. The hydraulic fluid leak detection system of claim 1 wherein the first sensor comprises a float sensor.

8. The hydraulic fluid leak detection system of claim 1 wherein the first sensor comprises a plurality of float sensors, the float sensors being disposed in an offset relationship with respect to each other.

9. The hydraulic fluid leak detection system of claim 1 wherein the second sensor is disposed within the reservoir.

10. The method as in claim 1 wherein the conduit includes an elongated tube structure.

11. The method as in claim 10 wherein the reservoir, expansion tank and tube structure are cooperatively arranged and positioned such that the fluid is siphoned from the expansion tank through the tube structure to the reservoir when the fluid in the reservoir cools.

12. The method for detecting the presence of a leak in the hydraulic system of a turf machine, the hydraulic system including a reservoir containing fluid and the method comprising the steps of:
   communicating fluid between the reservoir and an expansion tank through a conduit in response to expansion and contraction of the fluid due to thermal cycling;
   measuring the temperature of the fluid contained within the reservoir;
   estimating a level of fluid in the expansion tank based upon the measured fluid temperature;
   measuring an actual fluid level in the expansion tank using a level sensor which outputs a signal varying in accordance within a range of possible fluid levels;

signalling that a leak exists if the actual fluid level is not within a predefined buffer value of the estimated fluid level.

13. The method of claim 12 further comprising the steps of:
   determining the rate of change of the actual fluid level within the expansion tank; and
   signalling that a leak exists if at least one of the following conditions is detected, the first condition being that the rate of change of the actual fluid level in the expansion tank exceeds a predefined value, and the second condition being that the actual fluid level is not within a predefined buffer value of the estimated fluid level.

14. The method of claim 12 wherein the step of signalling comprises the steps of:
   illuminating a display lamp; and
   activating an audible alarm.

15. The method of claim 12 wherein the step of estimating comprises the steps of:
   measuring the temperature of fluid contained in the hydraulic fluid system;
   determining a level of fluid contained in the expansion tank at calibration; and
   determining the level of fluid in the expansion tank based on the level of fluid in the expansion tank at calibration and the temperature of fluid contained in the hydraulic fluid system.

16. The method of claim 13 wherein the step of determining the rate of change of the level of fluid in the expansion tank further comprises:
   setting an old fluid level;
   comparing the actual fluid level to the old fluid level; and
   setting the old fluid level equal to the actual fluid level after a predefined period of time.

17. A method for detecting the presence of a leak in the hydraulic system of a turf machine, the hydraulic system including a reservoir containing fluid and the method comprising the steps of:
   communicating fluid between the reservoir and an expansion tank in response to expansion and contraction of the fluid due to thermal cycling;
   measuring a fluid level in the expansion tank;
   determining a rate of change of the measured level within the expansion tank;
   measuring a temperature level of the fluid contained within the reservoir;
   estimating the level of fluid in the expansion tank based upon the measured temperature level of the fluid; and
   signalling the existence of a leak if at least one of the following conditions exists, the rate of change of the measured fluid level in the expansion tank exceeds a predefined value or the measured fluid level is not within a predefined buffer value of the estimated fluid level.

18. The method of claim 17 wherein the step of determining the rate of change of the level of fluid in the expansion tank comprises:
   setting an old fluid level;
   comparing the measured fluid level to the old fluid level; and
   setting the old fluid level equal to the measured fluid level after a predefined period of time.

19. The method of claim 18 wherein the step of estimating comprises the steps of:
   measuring the temperature of fluid contained in the hydraulic fluid system;
   determining a level of fluid contained in the expansion tank at calibration; and
   determining the level of fluid in the expansion tank based on the level of fluid in the expansion tank at calibration and the temperature of fluid contained in the hydraulic fluid system.

20. The method of as in claim 12 wherein the conduit includes an elongated tube structure.

* * * * *